United States Patent
Thomas et al.

(10) Patent No.: US 12,340,211 B2
(45) Date of Patent: Jun. 24, 2025

(54) SYSTEMS AND METHODS FOR REAL-TIME BINARY ANALYSIS WITH HOT PATCHING OF PROGRAMMABLE LOGIC CONTROLLERS

(71) Applicant: The MITRE Corporation, McLean, VA (US)

(72) Inventors: Roshan K. Thomas, Centreville, VA (US); Gananand G. Kini, Ashburn, VA (US)

(73) Assignee: The MITRE Corporation, McLean, VA (US)

( * ) Notice: Subject to any disclaimer, the term of this patent is extended or adjusted under 35 U.S.C. 154(b) by 91 days.

(21) Appl. No.: 18/117,170

(22) Filed: Mar. 3, 2023

(65) Prior Publication Data

US 2024/0296033 A1 Sep. 5, 2024

(51) Int. Cl.
| | |
|---|---|
| *G06F 8/656* | (2018.01) |
| *G05B 19/418* | (2006.01) |
| *G05B 23/02* | (2006.01) |
| *G06F 8/61* | (2018.01) |

(52) U.S. Cl.
CPC ........... *G06F 8/656* (2018.02); *G05B 19/418* (2013.01); *G05B 23/0235* (2013.01); *G06F 8/61* (2013.01)

(58) Field of Classification Search
CPC .................................................. G06F 8/60–66
USPC .................................................. 717/168–178
See application file for complete search history.

(56) References Cited

U.S. PATENT DOCUMENTS 10,657,262 B1   5/2020   Cui et al.
10,795,659 B1   10/2020  Kinsburskiy et al.

FOREIGN PATENT DOCUMENTS

| CA | 3109915 A1 | * | 2/2020 | ............ G06F 8/433 |
| EP | 3065076 A1 | * | 9/2016 | ......... G05B 19/0428 |
| EP | 3472746 B1 |   | 3/2020 | |
| FR | 3010202 A1 | * | 3/2015 | ......... G05B 23/0235 |

(Continued)

OTHER PUBLICATIONS

Buck et al. (2000). "An API for Runtime Code Patching" Journal of Supercomputing Applications and High Performance Computing; 12 pages.

(Continued)

*Primary Examiner* — Geoffrey R St Leger
(74) *Attorney, Agent, or Firm* — MORRISON & FOERSTER LLP

(57) ABSTRACT

Described herein are systems and methods for performing real-time binary analysis of code running in programmable logic controllers, and specifically to systems and methods for generating patches, testing patches, and implementing patches on programmable logic controllers while the controller is operating is provided. In one or more examples, a profile of the physical operation controlled by the PLC and the broader system can be generated. In one or more examples, once a profile has been generated, the system and methods described herein can capture data images that provide information regarding the operation of the system as well as the PLC. Based on the received data images, and the generated profile, the system can detect anomalies and/or safety constraint violations in the operation of the system that can be rectified or mitigated through patching (i.e., modification of the datasets or binary code used by the PLC).

21 Claims, 7 Drawing Sheets

(56) References Cited

FOREIGN PATENT DOCUMENTS

| JP | H05172862 A | * | 7/1993 | |
|---|---|---|---|---|
| WO | 2015/0163931 A1 | | 10/2015 | |
| WO | WO-2018217191 A1 | * | 11/2018 | .......... G06F 11/3041 |
| WO | WO-2021156596 A1 | * | 8/2021 | ........... G05B 19/056 |

OTHER PUBLICATIONS

Zhou et al. (2020). "KShot: Live Kernel Patching with SMM and SGX" 50th Annual IEEE/IFIP International Conference on Dependable Systems and Networks (DSN); 13 pages.

* cited by examiner

SYSTEMS AND METHODS FOR REAL-TIME BINARY ANALYSIS WITH HOT PATCHING OF PROGRAMMABLE LOGIC CONTROLLERS

FIELD OF THE DISCLOSURE

This disclosure relates to the real-time analysis of anomalies and the surgical patching of programmable logic controllers embedded within control systems of cyber-physical systems.

BACKGROUND OF THE DISCLOSURE

Programmable logic controllers (PLCs) are commonly and regularly utilized to control what is broadly referred to as cyber-physical systems (CPS). CPS is characterized by computerized control of control surfaces (valves, pumps, switches, rudders, ailerons etc.) to manage the stability and safety of physical operations. These include systems that operate process control applications, critical infrastructure, vehicular platforms in avionics and automotive sectors, and robots. For instance, programmable logic controllers are often employed in cyber-physical systems to control physical systems based data from sensors dispersed throughout the system as well as operator commands. The programmable logic controller takes as its inputs, commands and sensor data, invokes one or more control computations for estimating the current state of the system and calculating the consequent error corrections needed to the physical state of the system. These control computations then issue control signals to move various control surfaces of the physical system based on the required error compensation or impending operator directives.

Due to the central role that PLCs play in a cyber-physical systems they can be especially attractive targets for malicious cyber activity. In other words, malicious actors seeking to frustrate or take down a system, may choose to interfere with the normal operations of a PLC. For instance, in one or more examples, a malicious actor may seek to provide the PLC with falsified or corrupted input data so as to force the PLC to perform an improper operation. By "tricking" the PLC into believing that a certain condition is present, the malicious actor can cause the PLC to output various control signals under a false pretense or condition, that the PLC otherwise would not have outputted.

One method to combatting the corruption of a PLC (either by corrupting the sensor data or the code of the PLC itself) is to apply "patches" to the software that is running the PLC. In one or more examples, a patch can refer to changes to a computer program that is designed to fix known problems with the computer program or improve the computer program in some way. When a cyber-malicious actor corrupts the sensor data that the PLC is using as inputs, or corrupts the code being executed by the PLC, a patch can be formulated and applied to the PLC. In one or more examples, a PLC may need to be taken off-line (i.e., rendered temporarily inoperative) in order to formulate, create, test, and apply a new patch to the PLC. This can mean that in order to patch a PLC, the operation of the system in which the PLC operates may need to be halted or otherwise interrupted in order for the patching update to take place. In one or more examples, the patching process can include multiple steps including determining what portions of the PLC need to be patched, generating a patch, testing the patch to ensure that it maintains the safety requirements of the system, and once the patch has been tested, applying the patch to the PLC before returning the PLC to full operation.

In some examples, in order to keep up with malicious cyber actors, or to otherwise prevent errant operation of the PLC, a patch may need to be applied to the PLC as soon as an anomaly is detected. However, placing the PLC temporarily out of operation in order to generate and implement a patch will often not be acceptable with respect to the high uptime requirements of the system in which the PLC operates. Thus, a system and method that can identify the need for a patch, generate the patch, test the patch and implement the patch without interrupting the operation (or minimally interrupting the operation) of the PLC or otherwise requiring the PLC to significantly halt operations, can allow for the PLC to be hardened dynamically and continuously against cyber vulnerabilities as cyber threats become known. In sum, cyber vulnerabilities could be dealt with in near real-time without having to wait for an opportune time to take the PLC offline to patch it.

SUMMARY OF THE DISCLOSURE

Accordingly, systems and methods for performing real-time binary analysis of code running in programmable logic controllers, and specifically to systems and methods for generating patches, testing patches, and implementing patches on programmable logic controllers while the controller is operating is provided. In one or more examples, a profile of the physical operation controlled by the PLC and the broader system can be generated. In one or more examples, once a profile has been generated, the system and methods described herein can capture data images that provide information regarding the operation of the system as well as the PLC. Based on the received data images, and the generated profile, the system can detect anomalies and/or safety constraint violations in the operation of the system that can be rectified or mitigated through patching (i.e., modification of the datasets or binary code used by the PLC). For the purposes of this disclosure the terms "anomalies" and "safety constraint violations" are used interchangeably. Alternatively or additionally, in one or more examples, one or more safety analyses can be performed on the captured data images to determine if any safety-constraint violations have occurred and the PLC requires patching. In one or more examples, the system and methods described herein can be configured to detect anomalies prior to any incidents/accidents on the system and can also be configured to detect anomalies and/or conditions on the system after any incident/accidents have occurred.

In one or more examples, once the need for patching has been identified, in one or more examples a patch can be generated by the system based on the detected anomalies and safety constraints violated. In one or more examples, upon generating the patch, the system and methods described herein can verify the patch to ensure that it is viable and can be safely deployed onto the existing system. In one or more examples, once the patch has been verified, it can be installed in real-time onto the PLC without shutting down and restarting the PLC so as to minimize disruptions to the operation of the PLC and the CPS. In one or more examples, the patch can be configured to return the system to a stable state prior to the observed anomaly, or to account for compensating actions that can take the system forward in a safe manner and continue the physical operations.

According to one or more examples of the disclosure a method for deploying a patch for a programmable logic controller (PLC) deployed within a system comprises: generating a profile of the PLC, wherein the generated profile comprises one or more patterns observed in one or more data variables associated with operation of the PLC, receiving one or more data images of the PLC, wherein the data images of the PLC comprise recorded values of the one or more data variables associated with operation of the PLC and collected during operation of the PLC, detecting one or more anomalies in the received one or more data images based on, at least in part, a comparison between the received one or more data images and the generated profile, determining a patching strategy based on the detected anomalies, generating a patch based on the determined patching strategy, and installing the patch on the PLC while the PLC is operating the system.

Optionally, generating the profile of the PLC comprises: receiving one or more selections indicating the one or more data variables associated with operation of the PLC to observe, operating the system that the PLC is deployed on, observing the one or more selected data variables associated with operation of the PLC, determining one or more patterns within the one or more selected data variables, determining that the observation of the one or more selected data variables is sufficient to generate the profile, and generating the profile based on the determined one or more patterns within the one or more selected data variables.

Optionally, determining that the observation of the one or more selected data variables is sufficient to generate the profile comprises: comparing the observed one or more selected data variables to the determined one or more patterns within the one or more selected data variables, and determining whether the determined one or more patterns occur in the observed one or more selected data variables above a pre-determined percentage.

Optionally, the one or more data variables associated with operation of the PLC of the data image comprise the one or more data variables indicated by the received one or more selections.

Optionally, detecting one or more anomalies in the received one or more data images comprises applying threat intelligence information to the received one or more data images.

Optionally, detecting one or more anomalies in the received one or more data images comprises detecting one or more control logic invariant violations in the one or more data images.

Optionally, detecting one or more anomalies in the received one or more data images comprises determining a mode of operation of the system that the PLC is deployed on.

Optionally, determining a patching strategy based on the detected anomalies comprises: identifying one or more regions of interest in one or more portions of an operating code of the PLC based on the detected anomalies, performing a causality analysis on each of the identified one or more regions of interest, and determining the patching strategy based on the identified one or more regions of interest and the performed causality analysis.

In one or more examples of the disclosure, a computing system for deploying a patch for a programmable logic controller (PLC) deployed within a system comprises: a memory, one or more processors, and one or more programs, wherein the one or more programs are stored in the memory and configured to be executed by the one or more processors, the one or more programs when executed by the one or more processors cause the processor to: generate a profile of the PLC, wherein the generated profile comprises one or more patterns observed patterns in one or more data variables associated with operation of the PLC, receive one or more data images of the PLC, wherein the data images of the PLC comprise recorded values of the one or more data variables associated with operation of the PLC and collected during operation of the PLC, detect one or more anomalies in the received one or more data images based on, at least in part, a comparison between the received one or more data images and the generated profile, determine a patching strategy based on the detected anomalies, and generate a patch based on the determined patching strategy; and install the patch on the PLC while the PLC is operating the system.

In one or more examples of the disclosure, a non-transitory computer readable storage medium storing one or more programs for deploying a patch for a programmable logic controller (PLC) deployed within a system, the one or more programs comprising instructions, which, when executed by an electronic device with a display and a user input interface, cause the device to: generate a profile of the PLC, wherein the generated profile comprises one or more patterns observed patterns in one or more data variables associated with operation of the PLC, receive one or more data images of the PLC, wherein the data images of the PLC comprise recorded values of the one or more data variables associated with operation of the PLC and collected during operation of the PLC, detect one or more anomalies in the received one or more data images based on, at least in part, a comparison between the received one or more data images and the generated profile, determine a patching strategy based on the detected anomalies, generate a patch based on the determined patching strategy, and install the patch on the PLC while the PLC is operating the system.

DETAILED DESCRIPTION OF THE DISCLOSURE

Figure 1:
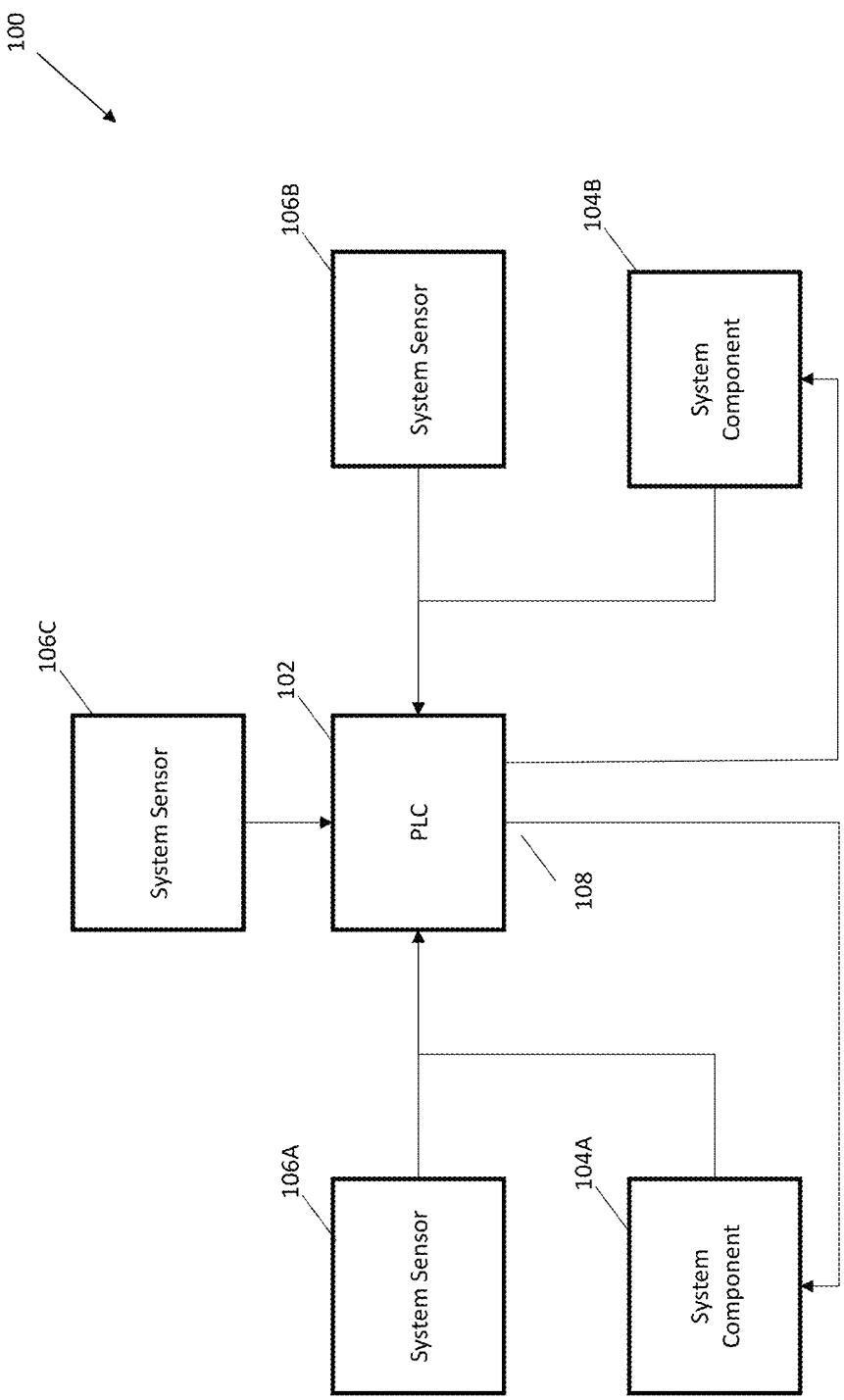
FIG. 1 illustrates an exemplary system operated by a programmable logic controller according to examples of the disclosure.

In the following description of the disclosure and embodiments, reference is made to the accompanying drawings in which are shown, by way of illustration, specific embodiments that can be practiced. It is to be understood that other embodiments and examples can be practiced, and changes can be made, without departing from the scope of the disclosure.

In addition, it is also to be understood that the singular forms "a," "an," and "the" used in the following description are intended to include the plural forms as well unless the context clearly indicates otherwise. It is also to be understood that the term "and/or" as used herein refers to and encompasses all possible combinations of one or more of the associated listed items. It is further to be understood that the terms "includes," "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Some portions of the detailed description that follow are presented in terms of algorithms and symbolic representations of operations on data bits within a computer memory. These algorithmic descriptions and representations are the means used by those skilled in the data processing arts to convey the substance of their work most effectively to others skilled in the art. The algorithm here is generally conceived to be a self-consistent sequence of steps (instructions) leading to a desired result. The steps are those requiring physical manipulations of physical quantities. Usually, though not necessarily, these quantities take the form of electrical, magnetic, or optical signals capable of being stored, transferred, combined, compared, and otherwise manipulated. It is convenient at times, principally for reasons of common usage, to refer to these signals as bits, values, elements, symbols, characters, terms, numbers, or the like. Furthermore, it is also convenient at times to refer to certain arrangements of steps requiring physical manipulations of physical quantities as modules or code devices without loss of generality.

However, all of these and similar terms are to be associated with the appropriate physical quantities and are merely convenient labels applied to these quantities. Unless specifically stated otherwise as apparent from the following discussion, it is appreciated that, throughout the description, discussions utilizing terms such as "processing," "computing," "calculating," "determining," "displaying," or the like refer to the action and processes of a computer system, or similar electronic computing device, that manipulates and transforms data represented as physical (electronic) quantities within the computer system memories or registers or other such information storage, transmission, or display devices.

Certain aspects of the present disclosure include process steps and instructions described herein in the form of an algorithm. It should be noted that the process steps and instructions of the present disclosure could be embodied in software, firmware, or hardware, and, when embodied in software, they could be downloaded to reside on and be operated from different platforms used by a variety of operating systems.

The present disclosure also relates to a device for performing the operations herein. This device may be specially constructed for the required purpose or it may comprise a general-purpose computer selectively activated or reconfigured by a computer program stored in the computer. Such a computer program may be stored in a non-transitory, computer-readable storage medium such as, but not limited to, any type of disk, including floppy disks, optical disks, CD-ROMs, magnetic-optical disks, read-only memories (ROMs), random access memories (RAMs), EPROMS, EEPROMs, magnetic or optical cards, application-specific integrated circuits (ASICs), or any type of media suitable for storing electronic instructions and each coupled to a computer system bus. Furthermore, the computers referred to in the specification may include a single processor or may be architectures employing multiple processor designs for increased computing capability and resiliency.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the present disclosure as described herein.

Programmable logic controllers (i.e., PLCs) are often employed to control mechanical/physical systems, machines, or other multi-component systems. A PLC can be characterized as a specialized computer or computing device that ingests sensor data about the system it controls as well as operator directives, makes critical control decisions and outputs "control signals" that instruct various actuators to move physical control elements/surfaces. Thus, in order to operate effectively, a PLC must not only accurately interpret the data it is receiving from the system, but it must also accurately translate that interpretation into various control actions that it can take on the physical system based on the perceived state of that system.

FIG. 1 illustrates an exemplary system operated by a programmable logic controller according to examples of the disclosure. The example system 100 of FIG. 1, illustrates a generic cyber-physical system 100 that is controlled/operated by a PLC 102 that is configured to operate the system. In one or more examples, the system 100 can include one or more components 104A-B. In one or more examples, the system components 104A-B can represent the actuator components of the system that are collectively configured to carry out the functions or tasks that the system is configured to perform. As an examples, in the context of an aircraft (i.e., an aviation system), the system components 104A-B could represent various actuator motors of the aircraft that collectively work together to move control surfaces such as the rudder, flaps, and ailerons to keep the aircraft stable and flying.

In one or more examples, the system 100 can also include one or more sensors 106A-C. The number of sensors and/or components in the system are just examples and should not be seen as limiting to the disclosure. PLCs such as the PLC 102 depicted in system 100 can be often used to centrally command and control large and complex systems that include large numbers of sensors and components. In one or more examples, the sensors 106A-C can be configured to collect data concerning the operational state of the system. Using the aircraft context for the purposes of illustration, the sensors 106A-C can include air pressure sensors, speed sensors (that measure the speed of the aircraft), angle of attack, temperature sensors, etc. The sensors 106A-C can provide raw information about the operation state of the system.

In one or more examples, the PLC 102 of the system 100 can input the raw data provided by the sensors, and generate one or more derived variables. Using the aviation context for the purpose of illustration, an aircraft can include a pitot tube (i.e., a type of sensor), to measure airflow and using the raw values received from the pitot tube sensor, a PLC (such as PLC 102) can derive other operational details about the aircraft such as its speed. Referring back to the generic system 100 of FIG. 1, the PLC 102 can thus not only use the raw values provided by each of the sensors 106A-C to determine the operational condition of the system 100, but can also apply one or more transformations or algorithms to the received raw data so as to generate one or more derived variables that also provide operational information about the system 100.

In one or more examples, a PLC 102 can include one or more outputs 108 that are communicatively coupled to one or more of the system components 104A-B so as to direct the operation of the system components. In one or more examples, the PLC can be configured to operate one or more of the system actuators 104A-B based on the raw data provided by each of the sensors 106A-C and/or the derived variables that are derived from the raw data received from the sensors. Using the aviation context for the purpose of illustration, a PLC (like PLC 102) can input raw pitot tube data (i.e. a sensor), derive the speed of the plane based on the received data, and then transmit one or more control signals to the engine thrust controllers of the aircraft (i.e., a component of the system) so as to increase or decrease the speed of the aircraft. Thus, in one or more examples, the PLC 102 can act as the "brains" of complex systems, taking in data from sensors and using that data for computations and decision making required to control one or more components of the system.

PLCs, given their central role in controlling the system, can often become attractive targets for malicious actors seeking to commandeer the system that is being controlled by the PLC. In one or more examples, malicious actors can manipulate PLCs by creating cyber-induced erroneous sensing and perception. In one or more examples, cyber-induced erroneous sensing and perception can refer to manipulation of sensor data or how the sensor data is processed, that ultimately can cause the PLC to falsely believe that the system to which the PLC is connected is operating in a state that in reality it is not operating in. Returning to the example aviation context, cyber-induced erroneous sensing and perception can include a malicious actor manipulating the sensor data received from a pitot tube to either inflate or deflate the values of the raw data before they are received by the PLC or to manipulate the raw data once it has been received and stored in the memory of the PLC. In one or more examples, cyber-induced erroneous sensing and perception can also include manipulating derived variables/values. In one or more examples, derived variables/values can be manipulated by either manipulating the calculated values after they have been derived from the raw sensor data or by manipulating the way in which the values are derived (i.e., by altering code related to the algorithm that converts the raw data into the derived variable.)

In either scenario (manipulation of raw data and/or manipulation of derived variables) the PLC can be manipulated into believing that the system is operating in a state that it is not in reality operating in. This can cause the PLC to take an action (by sending output control signals to the one or more control surface components of the system) that is unsafe for the actual operating state of the system and can thus lead to a cyber-induced accident (i.e., an accident caused by cyber malicious actor). Using the aviation context, if a cyber-actor manipulates the raw pitot tube data, or manipulates the way in which the PLC derives the speed of the aircraft from the pitot tube data, then the PLC may incorrectly judge the speed of the aircraft and attempt to increase or decrease thrust leading to an overspeed or stall condition.

In one or more examples, rather than inducing the PLC to incorrectly ascertain the operating state of the system it is operating, a cyber-malicious actor can also interfere with the operation of the system and thus the overall operation of the system by tampering with the code or software program that is used to operate the PLC. In one or more examples, by manipulating the code, while the PLC may be able to judge the correct operating condition of the system, it may take incorrect actions or be induced to incorrectly operate the components of the system in reaction to the determined operating state.

One method to combat the cyber-threats described above is to periodically update the software running the PLC by modifying the code that is used to operate the PLC. In one or more examples, when a threat is detected (i.e., the data received from the sensors has been manipulated and/or the code running the PLC itself has been altered), a patch can be applied to the PLC that modifies the code operating on the PLC to counteract the manipulations so as to ensure that the PLC operates normally and does not cause a cyber-induced accident during operation of the system. However, in one or more examples, generating a patch can be a lengthy and burdensome process that can ultimately interfere with the operation of a system. In one or more examples, the process of detecting a cyber-manipulation of the PLC, generating a patch to counter-act the threat, and applying the patch to the PLC can expend considerable resources and time. Furthermore, once a patch has been generated, the system may need to be taken off-line in order to apply the patch. In one or more examples, a patch can be applied to the system while the PLC is still operating, however in order to ensure that interruptions to system operations are kept at a minimum, the patch may need to take into account the state of the system before the patch was applied to ensure that the patch doesn't interfere with the continuous operation of the system. Thus, in one or more examples, a system that can dynamically harden a PLC against cyber-induced threats and that is self-certifying (i.e., does not require external intervention to certify that any patches generated will not cause safety issues with the system) can allow for robust protection of the system with minimal disruptions to its operation.

Figure 2:
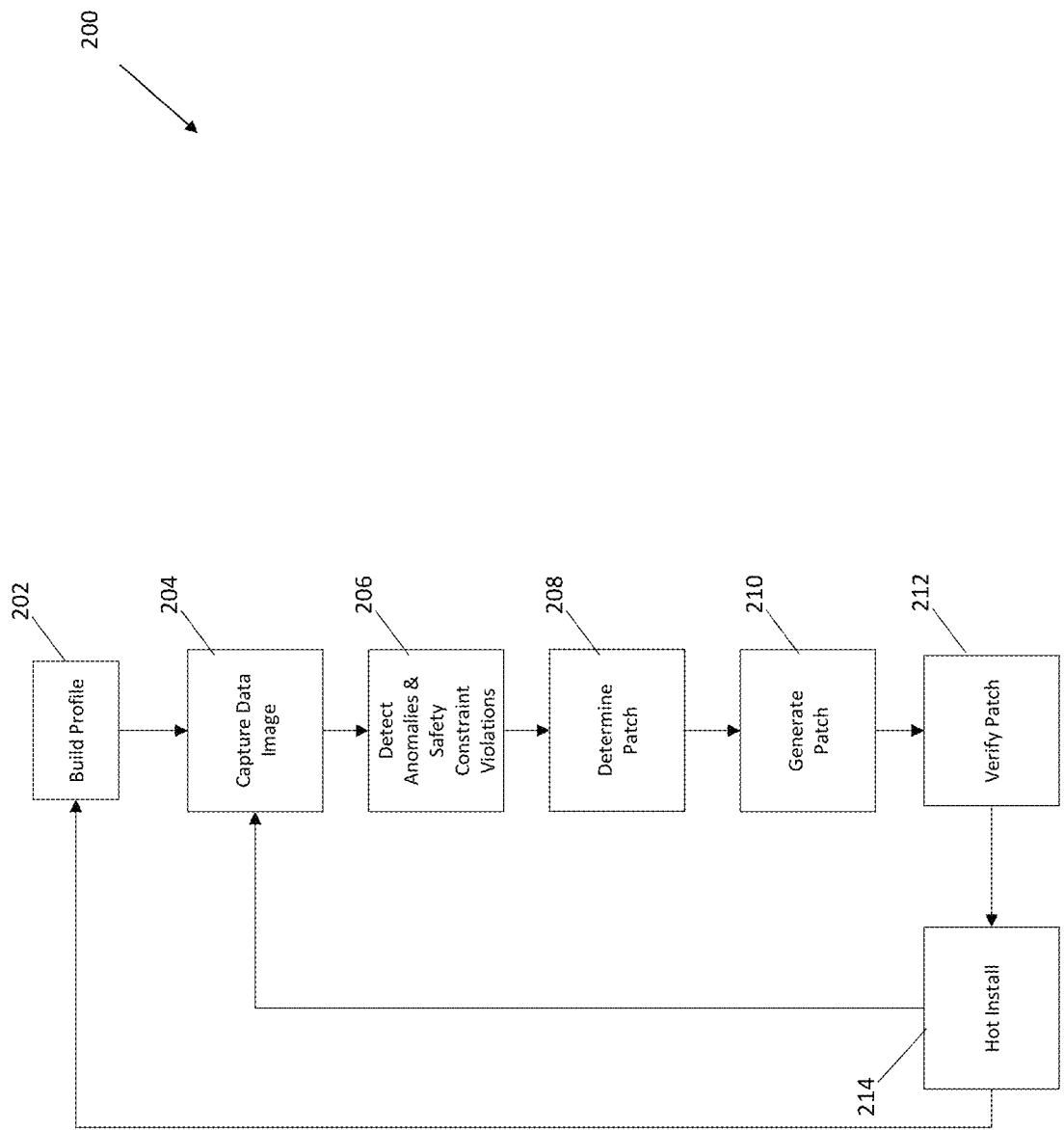
FIG. 2 illustrates an exemplary process for dynamically patching programmable logic controllers according to examples of the disclosure.

FIG. 2 illustrates an exemplary process for dynamically patching programmable logic controllers according to examples of the disclosure. In one or more examples, the process 200 of FIG. 2 can be used to dynamically generate patches for a PLC in response to detected anomalies in the system. In one or more examples, the process 200 of FIG. 2 can begin at step 202, wherein a profile of the system is generated. In one or more examples, generating a "profile" can refer to creating a snapshot or image of the normal operation of the system, that can be used as a reference when detecting anomalies or anomalous behavior in the system. In one or more examples, and as explained in further detail below, in order to build a profile, the system can be operated under normal conditions and certain data or variables associated with the system can be observed to look for patterns of behavior. In one or more examples, the "patterns" can be used as a reference, such that during operation of the system any deviations from the expected patterns can be flagged by the system as potentially anomalous behavior.

Figure 3:
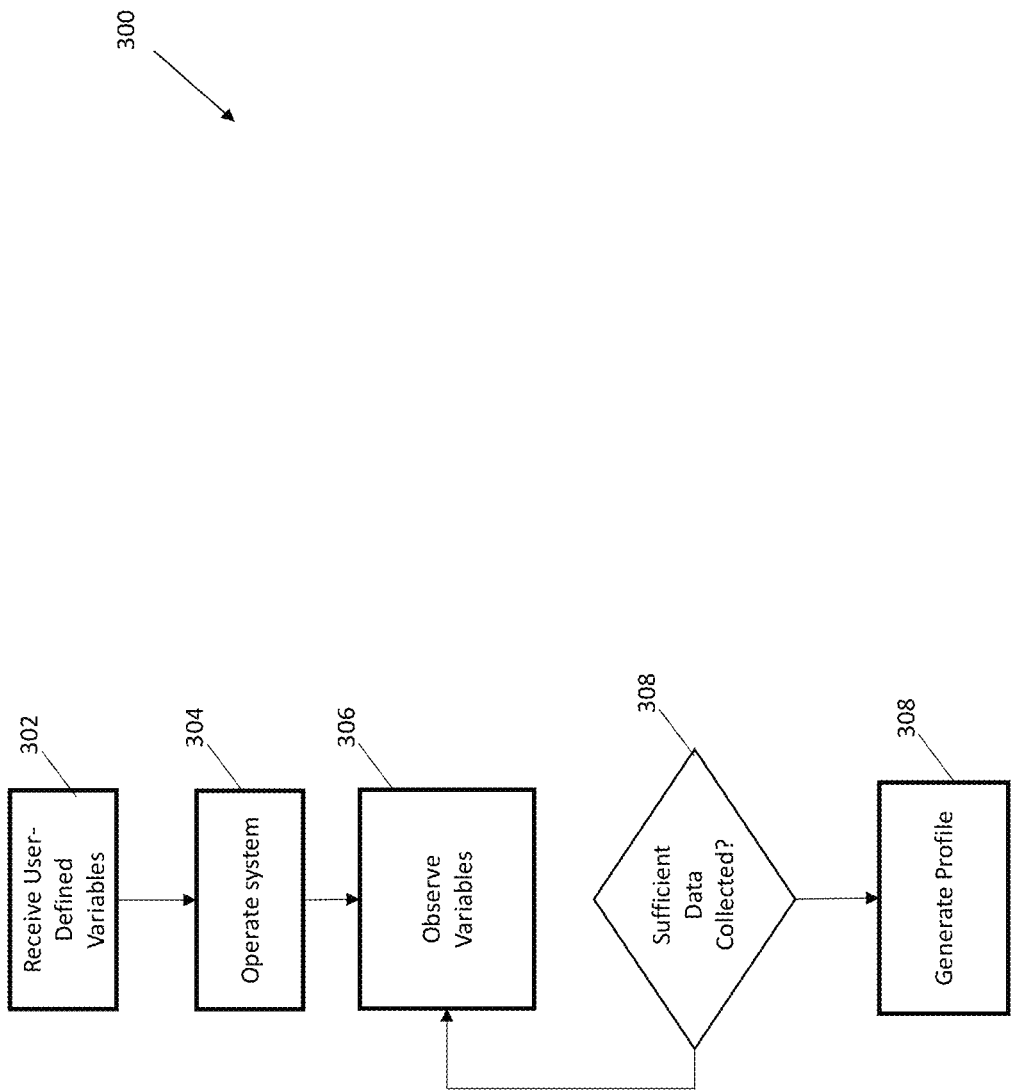
FIG. 3 illustrates an exemplary process for building a profile of a programmable logic controller according to examples of the disclosure.

FIG. 3 illustrates an exemplary process for building a profile of a programmable logic controller according to examples of the disclosure. In one or more examples, the process 300 can represent an exemplary process for generating a profile as described above with respect to step 202 of FIG. 2. The example process 300 of FIG. 3 should not be seen as limiting to the disclosure, and other alternative processes could be employed to generate a profile for a system that employs a PLC. In one or more examples, the process 300 of FIG. 3 can begin at step 302 wherein one or more user-defined variables are received by the system implementing process 200 of FIG. 2. In one or more examples, the user can define which sensors, data, or other information about the system will be observed to generate a profile of the PLC-run system. In one or more examples, the variables identified by the user can include safety critical variables (i.e., information the system provides that can help to determine if the system is operating under safe conditions). However, any variable that provides information about the operation of the system can be used to generate a profile of the system. The profile captures the regularity patterns of the physical system being controlled by one or more PLCs. In one or more examples, the user-defined variables can include information about various components in the system, information about the operational state of the PLC, data from the sensors operating in the system, and any other data provided by the system under test that can provide additional information about the operating conditions that the system is performing under or about the system components themselves.

In one or more examples, once the specification of variables that will be used to generate the profile is received at step 302, the process 300 can move to step 304 wherein the system for which the profile is being built is operated. In one or more examples, in order to generate a profile, the variables identified at step 302 can be observed over a period of time, such that patterns regarding the variables can be identified. Thus, in one or more examples, in order to accurately capture the patterns, the system can be operated in normal conditions so that the patterns of behavior for each of the variables accurately capture normal system operation. In one or more examples, once the system has begun operation at step 304, the process 300 can move to step 306 wherein the variables identified by the user are observed. As indicated above, observing the variables can include receiving information about the variables identified at step 302 during operation of the system, and can further include analyzing the received information to identify one or more patterns within the variables.

Using the aviation context for the purposes of illustration, a user can identify the pitot tube sensor data as a variable to be observed as part of the profile. The pitot tube sensor can then be observed during operation of the aircraft to determine patterns within the pitot tube data. For instance, in one or more examples, the system may observer that the pitot tube sensor data is transient during the beginning of a flight (i.e., when the aircraft undergoes its initial climb out) but then later stabilizes when the aircraft reaches steady state flight. In one or more examples, the system may also observe that the pitot tube sensor reading reverts to its transient behavior when the aircraft is descending towards the end of the flight.

In one or more examples, once the observation process has begun at step 306, the process 300 can move to step 308 wherein a determination is made as to whether sufficient data has been collected from the variables so as to generate a profile. In one or more examples, the sufficiency of the observation can be determined based on whether the behavior of the variables being observed can be accurately estimated to a pre-determined level of accuracy. As an example, if a pattern that has been observed within the identified variables occurs regularly with little variation (i.e., the pattern repeats within a pre-determined percentage), then the observation can be deemed to be sufficient and the process can move to step 310 wherein the profile is generated. However, if the pattern identified at step 306 does not reliably repeat itself, then in one or more examples, the process can continue the observation at step 306 until it is determined that the identified pattern is repeating to an acceptable level of accuracy. Once the observations have been determined to be sufficient at step 308, and as described above, the process 300 can move to step 310 wherein the profile is generated. In one or more examples, generating a profile can include storing the observed patterns identified at step 306 (and determined to be sufficient at step 308) so that they can be used as references when observing the same variables during future operation of the system, so as to detect anomalies in system operation.

Returning to the example of FIG. 2, once a profile has been built at step 202, the process 200 can move to step 204 wherein one or more data images of the system being evaluated (i.e., the PLC driven control system) are collected. In one or more examples, a data image can refer to a snapshot in time or over a pre-determined amount of time of the one or more variables identified by the user at step 202 that were used to generate the profile. As described above, in order to detect anomalies in system performance or behavior, the operational data of the system (i.e., the variables identified by the user) are compared to the profile to determine deviations from the patterns of behavior that are stored in the profile. Thus, in one or more examples, at step 204, one or more data images are captured (i.e., by collecting and storing the individual data variables in memory), and each data image captured at step 204 will be compared against the profile to detect anomalies in system behavior and/or performance as described in further detail below.

Figure 4:
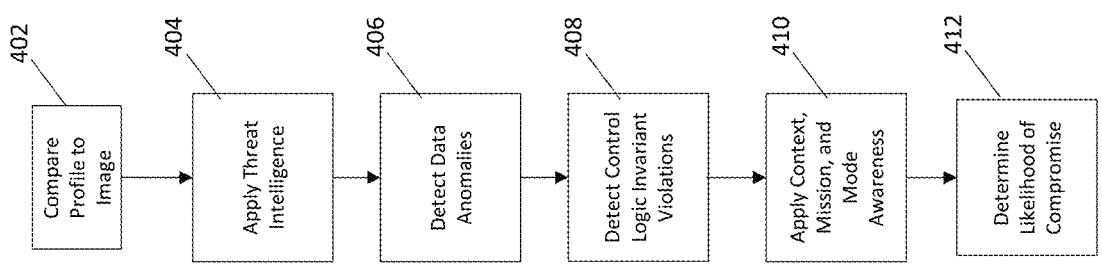
FIG. 4 illustrates an exemplary process for detecting anomalous behavior of a programmable logic controller according to examples of the disclosure.

In one or more examples, once the one or more data images are captured at step 204, the process 200 can move to step 206 wherein the captured images are used (along with other information) to determine the presence of one or more anomalies in the system under test's behavior and if such anomalies represent safety constraint violations that would warrant the need for patching of the PLC. In one or more examples, the data image captured at step 204 can act as a single data source out of a plurality of data sources that can be collectively utilized to determine anomalies in system behavior and ultimately determine the likelihood that the system under test has been compromised in some manner FIG. 4 illustrates an exemplary process for detecting anomalous behavior of a programmable logic controller according to examples of the disclosure. In one or more examples, the process 400 of FIG. 4 can be used to determine whether there has been a compromise in the PLC that requires patching. In one or more examples, the process 400 can begin at step 402 wherein the data images of critical variables captured at step 204 are compared against the profile of the system created at step 202 of process 200 as described above to determine if the data images include data that indicates a deviation from expected data bounds or observed patterns of behavior, contained within the profile generated at step 202. In one or more examples, deviations in patterns of behavior can include data whose fluctuations in values does not match the pattern of behavior contained within the profile. For instance, in one or more examples and using the aviation context for purposed of illustration, if a plane's altitude is observed to suddenly and significantly fluctuate in a phase of flight that is normally associated with stable flight (such as when cruising), then such a deviation can be an indication that the PLC or PLCs running the systems of the aircraft have been compromised in some way.

In one or more examples, observed deviations from profile behavior may be indicative of a compromise in the operation of the PLC which may require mediation through patching, however, the deviation may also have other explanations other than PLC compromise. Thus, in one or more examples, other data regarding system performance can also be accounted for when determining whether or not to generate a patch for the PLC. For instance, once the one or more data images collected from the system are compared against the profile at step 402, the process 400 can also perform steps 404 to 410 described below to gather further information that can corroborate any deviations from profile behavior detected at step 402. In one or more examples, each of steps 404 to 410 can be optional, meaning that each of steps 404 to 410 can be combined in any permutation and combination with step 402 to perform anomaly detection and ascertain the exact location and nature of the compromise.

In one or more examples, the process 400 can include applying threat intelligence information at step 404 to the data images to determine if any of the behaviors or patterns observed in the captured data images matches the profile of known cyber threats. For example, threat intelligence feeds may indicate that a certain type of cyber-attack has been spreading across a particular class of systems and PLCs. Such information can be used to quickly characterize the anomaly observed. In one or more examples, if a deviation from the system profile is observed at step 402, and/or the patterns observed in the data images match the profile of known threats, then there can be an increased likelihood that the PLC has been compromised such that a patch may need to be generated in order to mitigate the compromise.

In one or more example, the process 400 can also include step 406 wherein one or more anomalies are detected in the captured images based on or more "physics-based trust anchors." In one or more examples, a physics-based trust anchor can include one or more expected values of the data images based on the laws of physics, that if violated, would indicate a compromise of a PLC. In essence, a physics-based trust anchor enables trust to be established in data based on the laws of physics and for such laws to be used to filter out anomalous or tampered data. For example, it is well-known from physics that altitude and air pressure are related, specifically as altitude rises, air pressure drops. Using the aviation context as an example if the PLC determines that a commercial airline flight is traveling at an altitude of 0,000 feet (which is physically impossible) the system can determine that the result is an anomaly. Thus, in one or more examples, step 406 can determine if one or more of the variables contained with a data image is anomalous in the sense that it violates one or more pre-determined physics-based trust anchors.

In one or more examples, detecting anomalies at step 406 can include detecting mission-specific anomalies, wherein the captured image data can be analyzed to determine if there has been insufficient mission progress given the amount of time that the mission has been executed. In one or more examples, mission-specific anomalies can further include violation of mission requirements and safety requirements. In or more examples, and using the aviation context as an example, a mission-specific anomaly could include a determination that the distance the flight has covered is too low given the amount of time that has elapsed for the flight. In another example, a mission-specific anomaly example in the aviation context can include a determination that the amount of fuel that is indicated as being expended is too high given the distance covered by the aircraft.

In one or more examples, detecting anomalies at step 406 can include detecting one or more process-specific anomalies. In one or more examples, a process-specific anomaly can include unexpected process events in relation to expected process modes and progress. Additionally or alternatively, process-specific anomalies can include a determination that one or more process state variables are inconsistent with process progress or mode. Additionally, or alternatively, a process-specific anomaly can include a determination that conflicting process control commands have been issued by the PLC. Using the aviation context for the purposes of illustration, a process-specific anomaly can include detecting that a reverse thrust was initiated when the aircraft was in cruise mode. Other process-specific anomalies can include inconsistent/unsafe airspeed in cruise mode, and/or a rapid sequence of increase or decrease flaps during flight.

In one or more examples, detecting anomalies at step 406 can include detecting one or more network-based anomalies. In one or more examples, a network-based anomaly can include unexpected session creation and teardown with external computing devices. Additionally or alternatively, a network-based anomaly can include unexpected network commands and/or very high/low packet frequency within the network of the system. Using the aviation context as an example, a network-based anomaly can include a flight management server shutdown request, a remote session establishment request during flight, and/or infrequence engine status packets during operation of the flight.

In one or examples, detecting anomalies at step 406 can include detecting one or more data-driven anomalies in which the captured image data is analyzed to determine anomalies in the data values themselves. For instance, in one or more examples, a data-driven anomaly can include determining minimum, maximum, and out of range data conditions, anomalous rates of change in data, sampling rate frequency anomalies (as well as variance in sample rates) and attested data values. Using the aviation context for the purposes of example, a data-driven anomaly can include detecting that the aircraft is purported to be flying over its known maximum altitude (i.e., >40,000 ft), determining that the altitude rate of change is too high, and/or that a speed sensor value variance is too high given the known variances for a speed sensor.

In one or more examples, detecting anomalies at step 406 can include detecting one or more platform-dependent anomalies. In one or more examples, a platform-dependent anomaly can include detecting inconsistent rate changes in relation to scan cycle and clock cycles. Additionally or alternatively, a platform-dependent anomaly can include detecting anomalies relating to dependencies related to instruction sets, memory layout, and/or input-output processing. In one or more examples, and using the aviation context as an example, a platform-dependent anomaly can include detecting a high rate of change in a speed sensor process variable within a pre-defined number of scan cycles.

In one or more examples, the process 400 can also include step 408 wherein one or more control logic invariant violations are determined. In one or more examples, a control logic invariant can refer to one or more rules that cannot be violated by the PLC that if violated would indicate that the PLC has somehow been compromised and may need patching. As an example of an invariant, if a PLC activates a timer that counts up, then each successive value of the timer should be higher than the previous value until the timer is terminated. Thus, the invariant would be in the form of a rule that can indicate that each successive value of a counter should be higher than the previous value. However, if the data image reveals that a value of the timer is lower than its previous value or unchanged, then the invariant would be violated and such a violation could be indicative of a compromise that may need to be remedied through patching. In one or more examples, the invariants (i.e., rules) that can be applied do the data at step 408 can also be based on one or more physics-based trust anchors.

In one or more examples, the process 400 can also include step 410 wherein one or more of a mission and/or mode awareness are applied to the captured data images. In one or more examples, mission/mode awareness can refer to determining a mode of operation of the system under test or the overall mission of the system, that can then be used to determine if the captured data images (and the associated values of variables) are consistent with the determined mode or mission of the system under test. Using the aviation context as an example, if a flight is in a cruise mode (wherein the flight is maintaining a steady altitude) then a landing gear deployment command could be indicative of compromise since a landing gear command would not be commensurate with a cruise mode of the aircraft. Thus, in one or more examples, in order to determine if the data/variables in the captured data images are indicative of compromise, in one or more examples at step 410 the mode/mission of the aircraft can be determined to determine if any of the variables are not commensurate with the determined mode/mission of the aircraft.

In one or more examples, and as described above, once one or more of steps 404 to 410 are applied in conjunction to the comparison of the profile to the data image at step 402, then in one more examples, the process 400 can move to step 412 wherein a likelihood of compromise is determined. In one or more examples, step 412 can include looking at all of the indicators of compromise applied to the captured image data (i.e., steps 402 to 410) to determine overall likelihood of compromise. In one or more examples, each of the indicators provided by steps 402 to 410 can be uniformly weighted or can be given specific weights when determining the overall likelihood of compromise. Thus, in one or more examples, a certain factor might be more indicative of compromise and thus carry more weight than other indicators that are used to ascertain the likelihood of compromise. In one or more examples, only anomalies that are associated with a higher likelihood of compromise can be used to identify and generate patches for the PLC, whereas anomalies that are not associated with a high likelihood of compromise can be ignored for the purposes of patching. Thus, in one or more examples, step 206 of process 200 can include identifying anomalies that are specifically associated with a high likelihood of compromise.

Returning to the example of FIG. 2, and as discussed in detail with respect to FIG. 4, step 206 can involve detecting one or more anomalies in the captured data image (captured at step 204) that are indicative of a compromise in the operations of the PLC that is controlling the system. In one more examples, and as discussed above, a compromise can take many forms, but can include two specific types: (1) compromised sensor data, in which either the raw data received by the PLC does not reflect what is sensed by the sensor, or any derived variables that are derived from the received sensor data are inaccurately calculated leading to inaccurate data; and (2) compromised PLC code in which the processes run by the PLC in the system are not performed correctly (likely caused by a malicious actor modifying the operating program of the PLC.) In one or more examples, patching the PLC to account for anomalous behavior can entail determining the specific indicators of compromise to determine what aspect of the PLC has been compromised.

In one or more examples, once the anomalies and safety constraints have been detected at step 206, the process 200 can move to step 208 wherein a determination can be made as to what portion of the PLC's data or code is to be patched to mitigate the anomalies and safety constraints detected at step 206. In one or more examples, determining which portion of the PLC code to repair can include a process (described in detail below) wherein the anomalies identified at step 206 can be used to ultimately generate a patching strategy that can be configured to adjust/modify the PLC code thereby mitigating the root cause of the anomaly.

Figure 5:
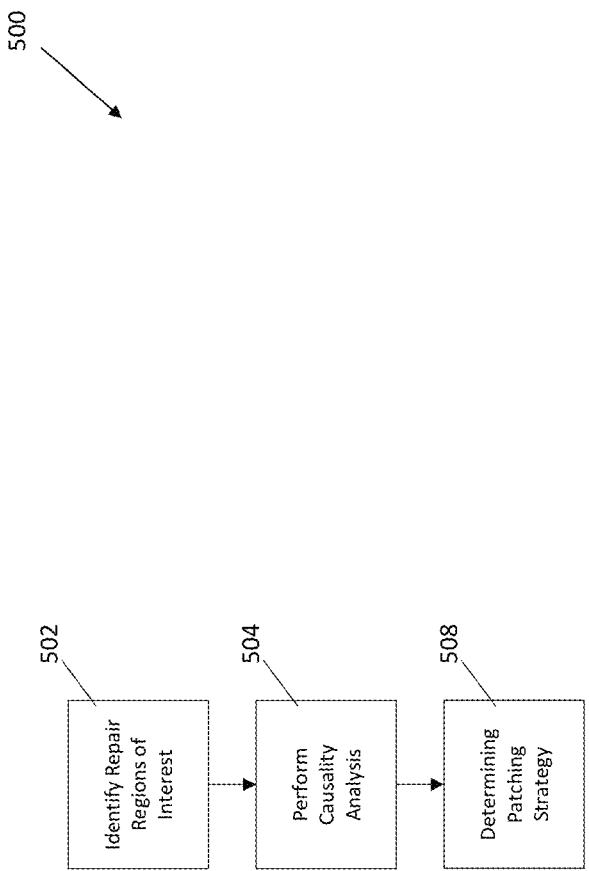
FIG. 5 illustrates an exemplary process for determining a patching strategy according to examples of the disclosure.

FIG. 5 illustrates an exemplary process for determining a patching strategy according to examples of the disclosure. In one or more examples, the process 500 of FIG. 5 can be used to convert the anomalies and safety constraint violations detected at step 206 into a patching strategy that when executed, aims to remedy the potential root cause of the anomaly. In one or more examples, the process 500 can include steps 502 and 504 (described in further detail below) which can be performed in parallel and/or sequentially in no specific order. Thus, while steps 502 and 504 are described for purposes of illustration in a specific order, the example should not be seen as limiting. In one or more examples, the process 500 can begin at step 502 wherein the anomalies and safety constraint violations identified at step 206 of process 200 can be used to identify one or more repair regions of interest. In one or more examples, a repair region of interest can refer to one or more portions of the PLC's operating code (i.e., the data cells that store values of variables and constants, or the application software that the PLC uses to operate the process control system that it is a part of) that may require patching based on the anomalies identified at step 206 of process 200. Safety constraints are expressed as relational expressions (e.g. altitude <45,000 feet) and the variables and constants in an expression can narrow down the repair region of interest if such variables and constants were tampered with. In one or more examples, identifying one or more regions of interest in the PLC code can include determining which portions of the code are associated with the anomalies detected at step 206. For instance, using the aviation context for the purpose of illustration, if an anomaly is detected with the altitude data recorded during operation of a flight, then in one or more examples, step 502 of process 500 can identify the portions of the PLC code that pertain to altitude calculation (including the relevant sensors that the PLC receives data from).

In one or more examples, once the repair regions of interest are determined at step 502, the process 500 can move to step 504 wherein a causality analysis is performed on the PLC code to determine the specific root causes in the identified regions of interest that could have caused the observed anomalies. In one or more examples, a causality analysis performed at step 504 can include determining the mode and process context that the system (which includes the PLC) was performing to narrow down the possible causes of the anomalies. In one or more examples, the specific process that the PLC was performing and/or the specific mode of operation that the PLC was in when the anomaly was detected can be used to establish a cause of the anomaly. In one or more examples, the causality analysis performed at step 504 can include looking at the captured image data (captured at step 204) to determine if one or more cyber-physical anchor invariants (i.e., data ranges of information associated with the operation of the cyber-physical system) have been violated, thereby narrowing down the possible causes of the anomalies using corroborating evidence.

In one or more examples, once the regions of interest have been identified at step 502, and the causality analysis has been performed at step 504, the process 500 can move to step 506 wherein the information derived from those steps is used to determine a patching strategy (i.e., a determination of the type of repair needed in order to mitigate the impact of the detected anomaly.) Thus, in one or more examples, the process 500 can take as its inputs the anomalies and safety constraint violations identified at step 206 of process 200, and as its output determine a patching strategy that not only identifies the specific portions of the code to be modified by the patch, but also identifies the way or ways in which the identified code should be modified so as to mitigate the suspected cause of the anomaly.

In one or more examples, the patching strategy can be determined by two primary considerations. First, the patching strategy can be determined and implemented at least in part using a "recoverability analysis" that tries to determine the state of the physical process when the anomaly and related safety constraint violation occurred. In one or more examples, the second consideration can be characterized as a "patch-tradeoff analysis". For every repair, a number of candidate patches may be possible and thus selecting the specific patch to use can include a trade-off analysis that compares and contrasts each of the alternatives. In one or more examples, in a trade-off analysis, each candidate patch can be evaluated on a number of criteria that can include but is not limited to: (1) Immediacy—whether the patch can be applied immediately or whether it has to wait for the physical process to get to a particular progress point; (2) Product-loss—whether applying the patch will result in the loss of the current product under production or control; (3) Permanence—whether the patch is stop-gap repair (that prevents additional damage) or a permanent fix; and (4) Coverage—whether the patch is applicable to the immediate anomaly or can be applied to a broad class of related vulnerabilities.

Figure 6:
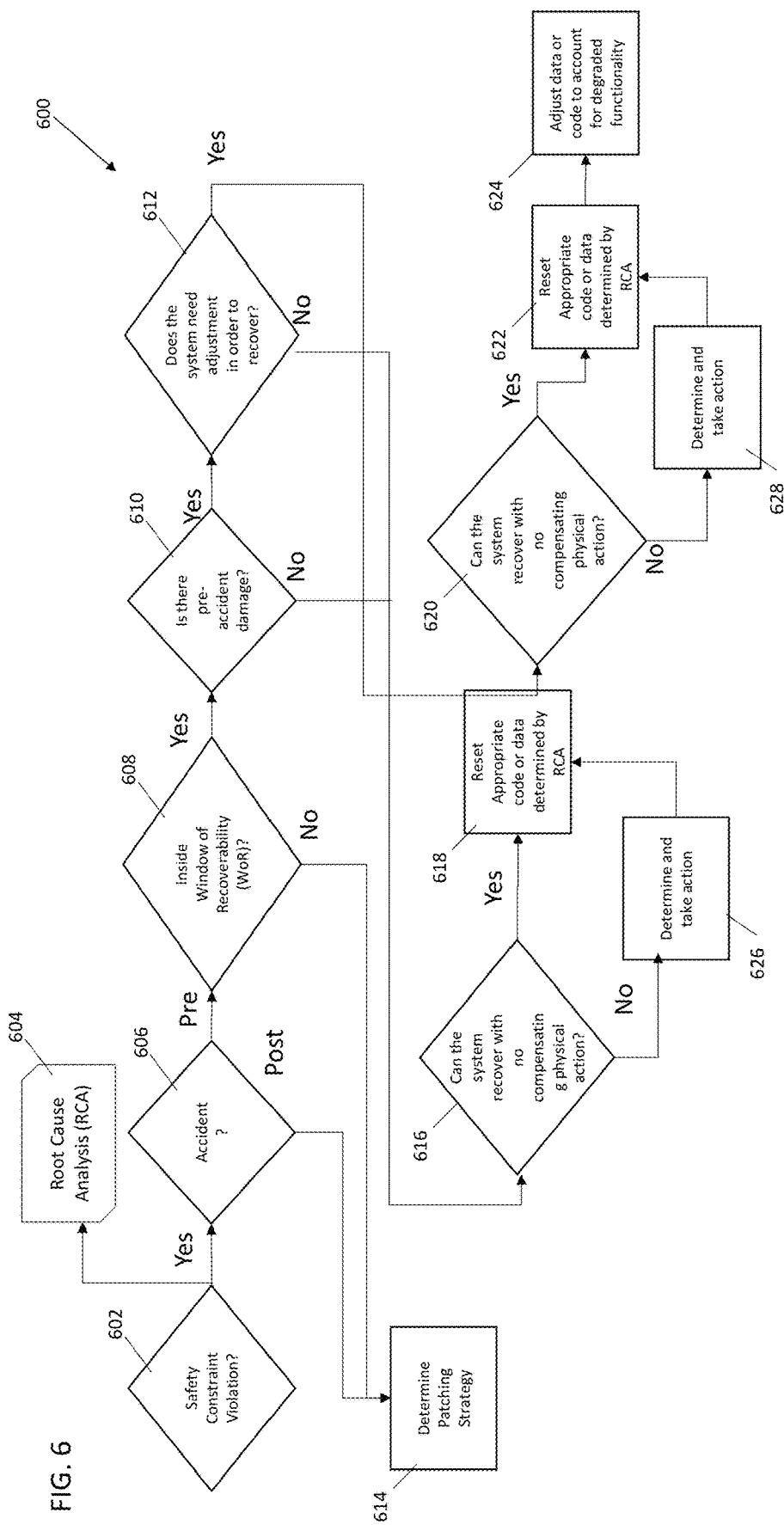
FIG. 6 illustrates an exemplary process for selecting and implementing a patching strategy according to examples of the disclosure.

With respect to the first consideration, a recoverability analysis can be a process that takes place during the process of determining a patch strategy. FIG. 6 illustrates an exemplary process for selecting and implementing a patching strategy according to examples of the disclosure. The process 600 can illustrate an exemplary process for determining a patching strategy that incorporates a recoverability analysis as part of the process of determining a patching strategy. In one or more examples, the process 600 can begin at step 602 wherein a determination is made as to whether a safety constraint (described in detail above) has been violated. In one or more examples, if a violation is found to have occurred at step 602, then the process 600 can move to step 604 wherein a root cause analysis is performed similar to the analysis described above with respect to step 504 of process 500 described above.

In one or more examples, and in parallel to the root cause analysis performed at step 604, once a safety constraint has been determined to be violated at step 602, the process 600 can move to step 606 wherein a determination can be made as to whether an accident or other impact has been experienced by the cyber-physical system as a result of the safety constraint violation. In one or more examples, determining whether an accident or impact has occurred as a result of the safety constraint violation can include utilizing data from one or more sensors associated with the cyber-physical system to determine a current state or status of the system. Additionally or alternatively, determining whether an accident has occurred can also include receiving an indication from a user of the system that an accident has occurred. In one or more examples, if it is determined that an accident has occurred at step 606 (i.e., that any patches applied will be "post" accident) then the process can move to step 614 wherein a process for determining a patching strategy as shown in process 500 described above with respect to FIG. 5, can be initiated.

In one or more examples, if at step 606 it is determined that an accident has not occurred (i.e., the cyber-physical is in a "pre" accident phase) then the process 600 can move to step 608 wherein a determination can be made as to whether the condition that caused the safety constraint violation is within a window of recoverability ("WoR"). In one or more examples, a WoR can refer to a time period in which the condition that caused the safety constraint violation can still be remedied. In one or more examples, the determination of whether a safety constraint violation is within a WoR can be based on sensor data associated with the cyber-physical system indicating the present status of the system as well as the nature and characteristic of the particular safety constrain violation. In one or more examples, if the safety constrain violation is not within the WoR as determined at step 608, then the process 600 can move to step 614 wherein a process for determining a patching strategy similar to the process 500 described above with respect to FIG. 5 can be initiated.

In one or more examples, if it is determined the safety constraint violation is within the WoR at step 608, then in one or more examples, the process 600 can move to step 610 wherein a determination is made as to whether there is any pre-accident damage. In one or more examples, pre-accident damage can refer to any damage to the cyber-physical system that has not caused an accident or otherwise has caused the cyber-physical system to operate with degraded functionality or even cease operating altogether. In one or more examples, a determination regarding pre-accident damage can be made so as to determine whether ultimately the code (i.e., the patch) will need to be formulated and adjusted to account for any degraded functionality associated with the damage. For instance, in the context of an airplane, if the damage caused a reduction in the maximum airspeed of the aircraft, then the code of the PLC would need to be adjusted to account for the lowered maximum threshold. In one or more examples, if it determined that there is no pre-accident damage at step 610 then the process 600 can move to step 616 (described in further detail below).

If it is determined that there is pre-accident damage at step 610, then the process 600 can move to step 612, wherein a determination is made as to whether the system (i.e., the cyber or cyber-physical system) will require adjustment (i.e., via adjusting the code or the data as described above), in order to mitigate the damage. In one or more examples, even though there may be pre-accident damage, a pragmatic solution to remedying the effects of the damage may not be available. Thus, at step 612 a determination is made as to whether the system can be adjusted. The assessment made at step 612 can include analyzing sensor data associated with the cyber-physical system, computing the system's current state from validated sensor data, as well as assessing the nature of the safety constraint violation (i.e., the degree to which the constraint had been violated) to determine whether a system adjustment can be made to account for the damage caused. In one or more examples if it determined that an adjustment to the PLC code or sensor data will not be able to remedy the damage at step 612 then the process 600 can move to step 616 (described in further detail below).

If however, it is determined that an adjustment can remedy the damage at step 612, then the process 600 can move to step 620 wherein a determination is made as to whether the system can recover with no compensating physical action. In one or more examples, a compensating physical action can refer to an operation by the cyber-physical system to mitigate the damage that is not part of the normal operation of the cyber-physical system. To illustrate, an example of a compensating action is the injection of a liquid agent to seal miniature cracks on the walls of a boiler that overheated. If it is determined that the system cannot recover without taking a compensating physical action, then the process 600 can move to step 628 wherein a compensating physical action can be determined and implemented. Once the compensating physical action is taken at step 628, then the process 600 can move step 622, wherein the code and/or sensor data that is implicated by the root cause analysis performed at step 604 is reset. If however, at step 620 if it is determined that the system can recover without taking a compensating physical action then the process can move directly to step 622.

In one or more examples, once the code and data has been reset at step 622, the process 600 can move to step 624 wherein the code and/or data can be adjusted in accordance with the determination made at step 612. The reset of step 622 can be configured to reset the code and data that caused the safety constraint violation, wherein the adjustment at step 624 can be done to account for the damage to the system caused by the safety constraint violation.

If it is determined that there is no pre-accident damage at step 610 or that the code/data does not need adjustment to mitigate the damage at step 612, then in one or more examples, the process 600 can move to step 616 wherein a determination is made as to whether the system can recover with no physical action. Step 616 can be substantially identical to step 620 described above. Similar to the description regarding 620, if at step 616 if it determined that the system cannot be recovered without performing a compensating physical action, then the process 600 can move to step 626 wherein the compensating physical action can be determined and implemented. The process of determining and implement the compensating physical action can be substantially similar to step 628 described above. Once the physical action has been implemented at step 626, the process can move to step 618 wherein the code and/or data is reset as determined by the RCA in substantially the same manner as described above. In one or more examples, if it is determined at step 616 that the system can recover without a compensating physical action, then the process 600 can move directly to step 618.

Returning to the example of FIG. 2, once the patch has been determined (i.e., the patching strategy) at step 208, in one or more examples, the process can move to step 210 wherein the patch is generated based on the strategy determined at step 208. In one or more examples, once the patch has been generated at step 210, the process 200 can move to step 212 wherein the patch is analyzed and verified to ensure that the generated patch does not compromise the safety of the system to which it will be deployed. In one or more examples, verifying the patch itself will include checking the patch against one or more pre-determined safety constraints to ensure that the patch does not violate the safety constraints. In one or more examples, the one or more safety constraints can be formulated to ensure that the patch itself does not create a unsafe operating condition in the system to which it will be deployed, or otherwise does not compromise the operation of the PLC to which the patch will deployed.

In one or more examples, once the patch has been verified at step 212, the process 200 can move to step 214 wherein the patch is installed onto the PLC. In one or more example, the patch can be loaded onto to the PLC using a "hot install" process in which the PLC is updated while it is operating the system, or in a manner that minimizes any disruptions to the system caused by the installation of the patch. Thus, in one or more examples, performing a "hot install" process to load the generated patch onto the PLC can include determining a time when installing the patch will minimize disruption to the PLC operation (for instance in a time period where the commands from the PLC occur infrequently) and scheduling the install at the determined time period.

In one or more examples, once the patch has been installed the process 200 can revert back to step 202 wherein the profile of the system built at step 202 can be modified to include any information gleaned from the anomaly detection and patching process. For example, the profile may be updated to reflect that the system will operate at a lower capacity (e.g. lower cruising altitude, lower temperature, lower speed etc.) Additionally or alternatively, the process can also revert back to step 204 wherein more data images are captured for the purpose of detecting any new anomalies that may need patches in order to be remedied. As described above, the process 200 as well as the other processes described above with respect to FIGS. 3-6 can ultimately allow for a cyber-physical system or other system operated by a PLC to not only patch code so as to prevent future accident or anomalies, but can also allow for any damage created by the anomalous data to be accounted for in future operation of the system thereby reducing the overall time that the cyber-physical system will be down due to patching code or repairing erroneous operation of the system.

Figure 7:
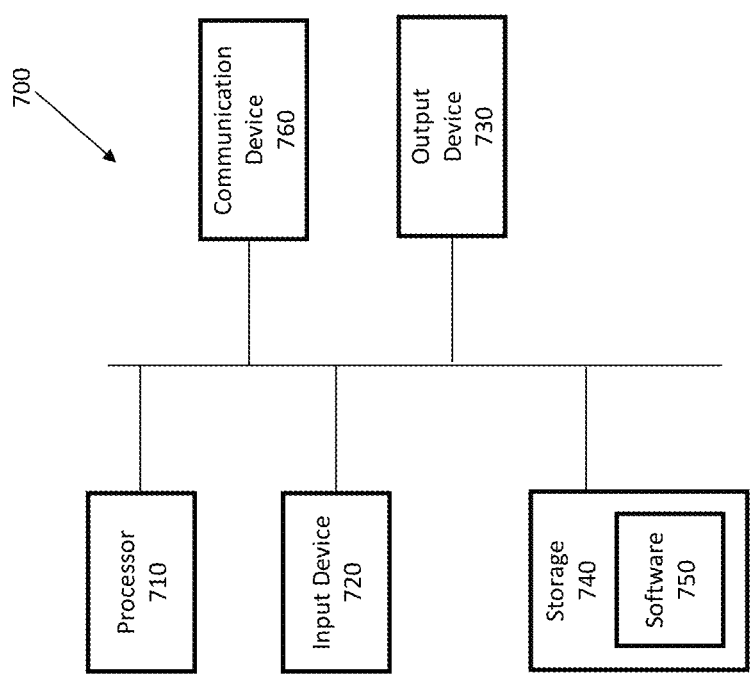
FIG. 7 illustrates an example of a computing device in accordance with one or more examples of the disclosure.

FIG. 7 illustrates an example of a computing device in accordance with one embodiment. Device 700 can be a host computer connected to a network. Device 700 can be a client computer or a server. As shown in FIG. 6, device 700 can be any suitable type of microprocessor-based device, such as a personal computer, workstation, server, or handheld computing device (portable electronic device) such as a phone or tablet. The device can include, for example, one or more of processor 610, input device 720, output device 730, storage 740, and communication device 760. Input device 720 and output device 730 can generally correspond to those described above and can either be connectable or integrated with the computer.

Input device 720 can be any suitable device that provides input, such as a touch screen, keyboard or keypad, mouse, or voice-recognition device. Output device 730 can be any suitable device that provides output, such as a touch screen, haptics device, or speaker.

Storage 740 can be any suitable device that provides storage, such as an electrical, magnetic, or optical memory, including a RAM, cache, hard drive, or removable storage disk. Communication device 760 can include any suitable device capable of transmitting and receiving signals over a network, such as a network interface chip or device. The components of the computer can be connected in any suitable manner, such as via a physical bus or wirelessly.

Software 750, which can be stored in storage 740 and executed by processor 610, can include, for example, the programming that embodies the functionality of the present disclosure (e.g., as embodied in the devices as described above).

Software 750 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 740, that can contain or store programming for use by or in connection with an instruction execution system, apparatus, or device.

Software 750 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate, or transport programming for use by or in connection with an instruction execution system, apparatus, or device. The transport readable medium can include, but is not limited to, an electronic, magnetic, optical, electromagnetic, or infrared wired or wireless propagation medium.

Device 700 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Device 700 can implement any operating system suitable for operating on the network. Software 750 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

This application discloses several numerical ranges in the text and figures. The numerical ranges disclosed inherently support any range or value within the disclosed numerical ranges, including the endpoints, even though a precise range limitation is not stated verbatim in the specification, because this disclosure can be practiced throughout the disclosed numerical ranges.

The above description is presented to enable a person skilled in the art to make and use the disclosure, and it is provided in the context of a particular application and its requirements. Various modifications to the preferred embodiments will be readily apparent to those skilled in the art, and the generic principles defined herein may be applied to other embodiments and applications without departing from the spirit and scope of the disclosure. Thus, this disclosure is not intended to be limited to the embodiments shown but is to be accorded the widest scope consistent with the principles and features disclosed herein. Finally, the entire disclosure of the patents and publications referred in this application are hereby incorporated herein by reference.

What is claimed is:

1. A method for deploying a patch for a programmable logic controller (PLC) deployed within a system, the method comprising:
   generating a profile of the PLC, wherein the generated profile comprises one or more patterns observed in one or more data variables associated with operation of the PLC, wherein generating the profile of the PLC comprises:
   receiving one or more selections indicating the one or more data variables associated with operation of the PLC to observe,
   operating the system that the PLC is deployed on,
   observing the one or more data variables associated with operation of the PLC,
   determining the one or more patterns within the one or more data variables,
   determining that the observation of the one or more data variables is sufficient to generate the profile, and
   generating the profile based on the one or more patterns within the one or more data variables;
   receiving one or more data images of the PLC, wherein the data images of the PLC comprise recorded values of the one or more data variables associated with operation of the PLC and collected during operation of the PLC;
   detecting one or more anomalies in the received one or more data images based on, at least in part, a comparison between the received one or more data images and the generated profile;
   determining a patching strategy based on the detected anomalies;
   generating a patch based on the determined patching strategy; and
   installing the patch on the PLC while the PLC is operating the system.

2. The method of claim 1, wherein determining that the observation of the one or more data variables is sufficient to generate the profile comprises:
   comparing the observed one or more data variables to the one or more patterns within the one or more data variables; and
   determining whether the one or more patterns occur in the observed one or more data variables above a predetermined percentage.

3. The method of claim 1, wherein the one or more data variables associated with operation of the PLC of the received one or more data images comprise the one or more data variables indicated by the received one or more selections.

4. The method of claim 1, wherein detecting one or more anomalies in the received one or more data images comprises applying threat intelligence information to the received one or more data images.

5. The method of claim 1, wherein detecting one or more anomalies in the received one or more data images comprises detecting one or more control logic invariant violations in the one or more data images.

6. The method of claim 1, wherein detecting one or more anomalies in the received one or more data images comprises determining a mode of operation of the system that the PLC is deployed on.

7. The method of claim 1, wherein determining a patching strategy based on the detected anomalies comprises:
identifying one or more regions of interest in one or more portions of an operating code of the PLC based on the detected anomalies;
performing a causality analysis on each of the identified one or more regions of interest; and
determining the patching strategy based on the identified one or more regions of interest and the performed causality analysis.

8. A computing system for deploying a patch for a programmable logic controller (PLC) deployed within a system, the computing system comprising:
a memory;
one or more processors; and
one or more programs, wherein the one or more programs are stored in the memory and configured to be executed by the one or more processors, the one or more programs when executed by the one or more processors cause the processor to:
generate a profile of the PLC, wherein the generated profile comprises one or more patterns observed in one or more data variables associated with operation of the PLC, wherein generating the profile of the PLC comprises:
receiving one or more selections indicating the one or more data variables associated with operation of the PLC to observe,
operating the system that the PLC is deployed on,
observing the one or more data variables associated with operation of the PLC,
determining the one or more patterns within the one or more data variables,
determining that the observation of the one or more data variables is sufficient to generate the profile, and
generating the profile based on the one or more patterns within the one or more data variables;
receive one or more data images of the PLC, wherein the data images of the PLC comprise recorded values of the one or more data variables associated with operation of the PLC and collected during operation of the PLC;
detect one or more anomalies in the received one or more data images based on, at least in part, a comparison between the received one or more data images and the generated profile;
determine a patching strategy based on the detected anomalies;
generate a patch based on the determined patching strategy; and
install the patch on the PLC while the PLC is operating the system.

9. The computing system of claim 8, wherein determining that the observation of the one or more data variables is sufficient to generate the profile comprises:
comparing the observed one or more data variables to the one or more patterns within the one or more data variables; and
determining whether the one or more patterns occur in the observed one or more data variables above a predetermined percentage.

10. The computing system of claim 8, wherein the one or more data variables associated with operation of the PLC of the received one or more data images comprise the one or more data variables indicated by the received one or more selections.

11. The computing system of claim 8, wherein detecting one or more anomalies in the received one or more data images comprises applying threat intelligence information to the received one or more data images.

12. The computing system of claim 8, wherein detecting one or more anomalies in the received one or more data images comprises detecting one or more control logic invariant violations in the one or more data images.

13. The computing system of claim 8, wherein detecting one or more anomalies in the received one or more data images comprises determining a mode of operation of the system that the PLC is deployed on.

14. The computing system of claim 8, wherein determining a patching strategy based on the detected anomalies comprises:
identifying one or more regions of interest in one or more portions of an operating code of the PLC based on the detected anomalies;
performing a causality analysis on each of the identified one or more regions of interest; and
determining the patching strategy based on the identified one or more regions of interest and the performed causality analysis.

15. A non-transitory computer readable storage medium storing one or more programs for deploying a patch for a programmable logic controller (PLC) deployed within a system, the one or more programs comprising instructions, which, when executed by an electronic device with a display and a user input interface, cause the device to:
generate a profile of the PLC, wherein the generated profile comprises one or more patterns observed in one or more data variables associated with operation of the PLC, wherein generating the profile of the PLC comprises:
receiving one or more selections indicating the one or more data variables associated with operation of the PLC to observe,
operating the system that the PLC is deployed on,
observing the one or more data variables associated with operation of the PLC,
determining the one or more patterns within the one or more data variables,
determining that the observation of the one or more data variables is sufficient to generate the profile, and
generating the profile based on the one or more patterns within the one or more data variables;
receive one or more data images of the PLC, wherein the data images of the PLC comprise recorded values of the one or more data variables associated with operation of the PLC and collected during operation of the PLC;
detect one or more anomalies in the received one or more data images based on, at least in part, a comparison between the received one or more data images and the generated profile;
determine a patching strategy based on the detected anomalies;
generate a patch based on the determined patching strategy; and
install the patch on the PLC while the PLC is operating the system.

16. The non-transitory computer readable storage medium of claim 15, wherein determining that the observation of the one or more data variables is sufficient to generate the profile comprises:
    comparing the observed one or more data variables to the one or more patterns within the one or more data variables; and
    determining whether the one or more patterns occur in the observed one or more data variables above a predetermined percentage.

17. The non-transitory computer readable storage medium of claim 15, wherein the one or more data variables associated with operation of the PLC of the received one or more data images comprise the one or more data variables indicated by the received one or more selections.

18. The non-transitory computer readable storage medium of claim 15, wherein detecting one or more anomalies in the received one or more data images comprises applying threat intelligence information to the received one or more data images.

19. The non-transitory computer readable storage medium of claim 15, wherein detecting one or more anomalies in the received one or more data images comprises detecting one or more control logic invariant violations in the one or more data images.

20. The non-transitory computer readable storage medium of claim 15, wherein detecting one or more anomalies in the received one or more data images comprises determining a mode of operation of the system that the PLC is deployed on.

21. The non-transitory computer readable storage medium of claim 15, wherein determining a patching strategy based on the detected anomalies comprises:
    identifying one or more regions of interest in one or more portions of an operating code of the PLC based on the detected anomalies;
    performing a causality analysis on each of the identified one or more regions of interest; and
    determining the patching strategy based on the identified one or more regions of interest and the performed causality analysis.

\* \* \* \* \*